Figures 1, 2:
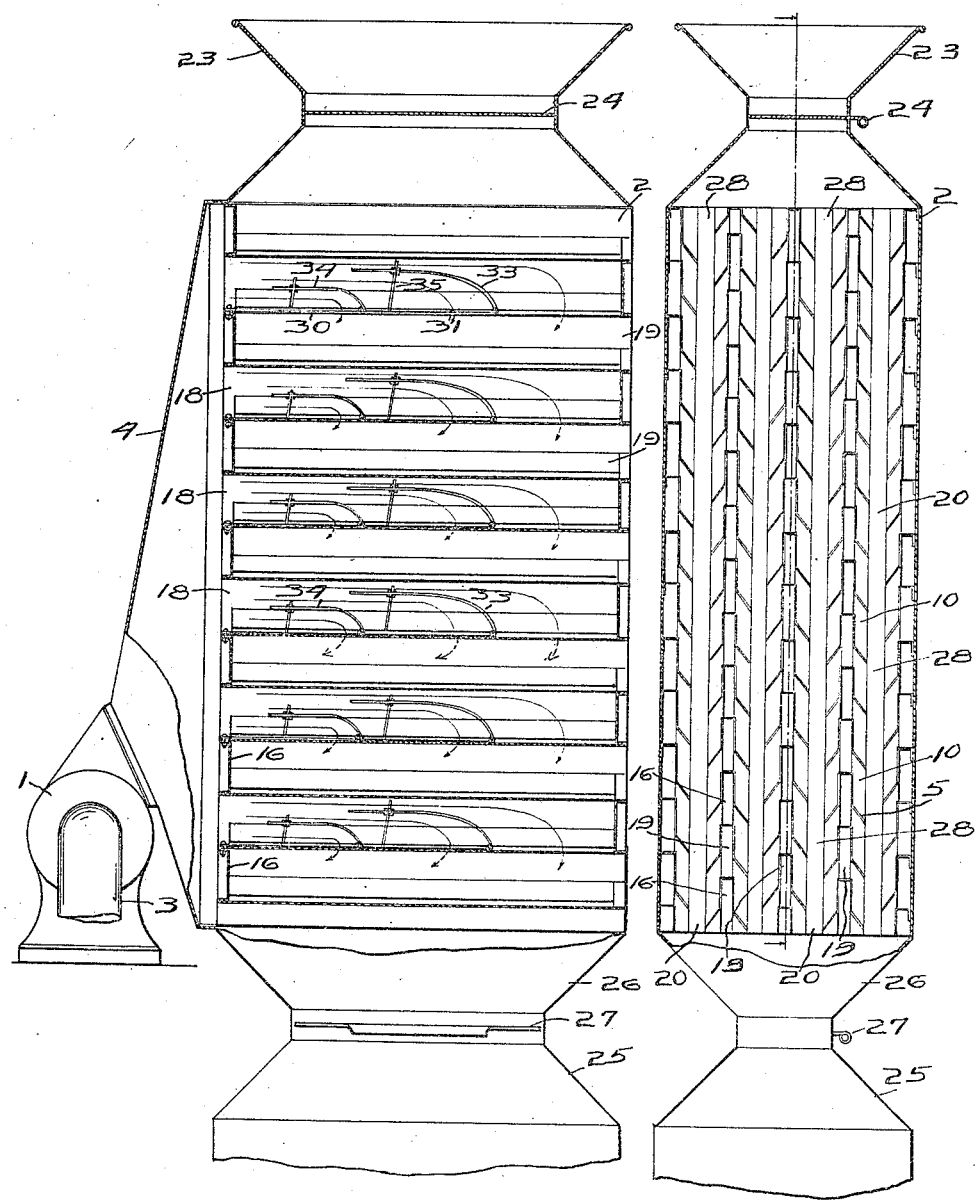

W. J. SEDELBAUER.
GRAIN DRIER.
APPLICATION FILED MAY 15, 1918.

1,282,960.

Patented Oct. 29, 1918.
2 SHEETS—SHEET 1.

INVENTOR
William J. Sedelbauer
by
Owen, Owen & Crampton

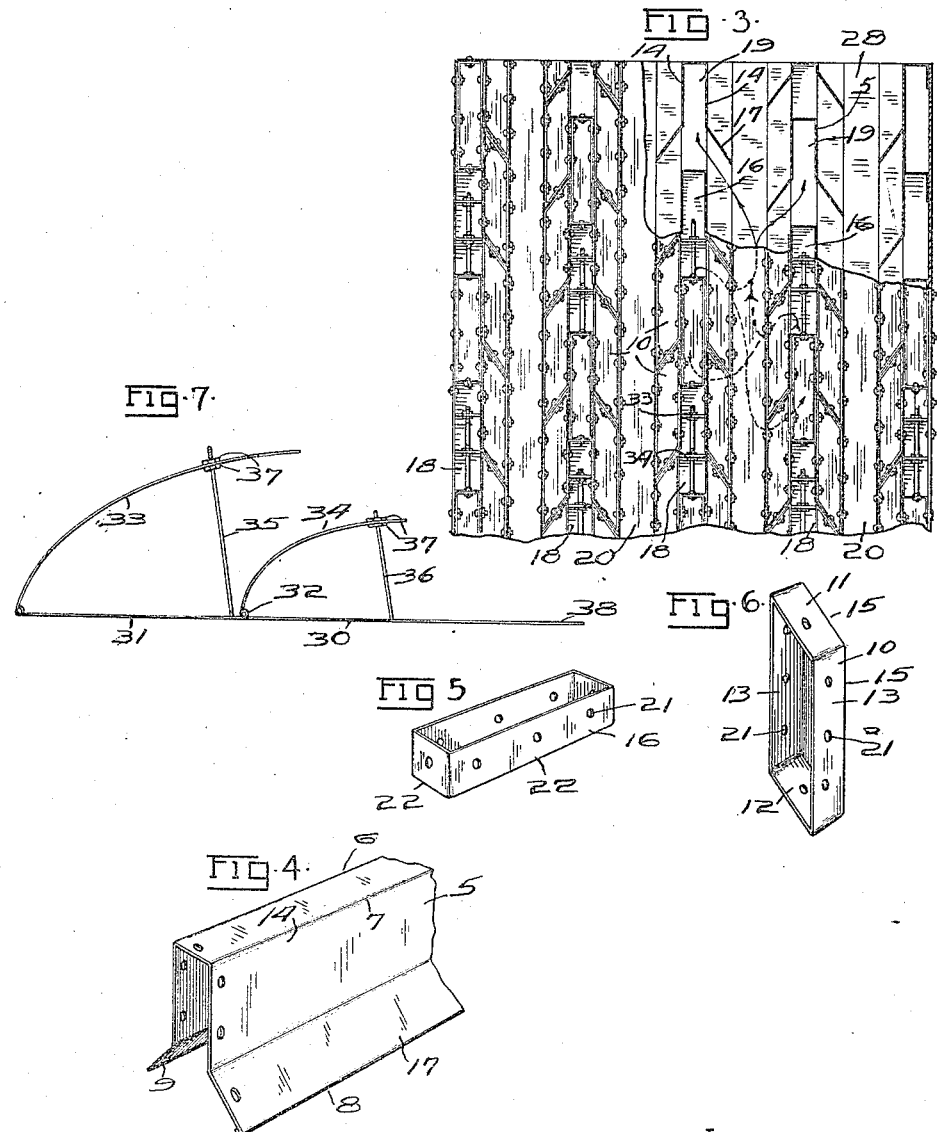

UNITED STATES PATENT OFFICE.

WILLIAM J. SEDELBAUER, OF TOLEDO, OHIO.

GRAIN-DRIER.

1,282,960.   Specification of Letters Patent.   Patented Oct. 29, 1918.

Application filed May 15, 1918. Serial No. 234,732.

*To all whom it may concern:*

Be it known that I, WILLIAM J. SEDELBAUER, a citizen of the United States, and a resident of Toledo, in the county of Lucas and State of Ohio, have invented a certain new and useful Grain-Drier; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

My invention has for its object to provide a grain drier that may be readily assembled and which will efficiently dry the grain without injury to the shell or outer coating of the grain. It also has for its object to provide a grain drier wherein the parts thereof may be readily removed and either repaired or replaced. Another object of the invention is to provide a drier wherein the air will be uniformly directed and spread over the grain.

The invention may be contained in different structures for drying or cooling or otherwise treating material with a gaseous material, such as air. To show a practical application of the invention, I have selected one form of structure containing the invention and shall describe it hereinafter. The structure selected is illustrated in the accompanying drawings.

Figure 1, is a vertical longitudinal section of the drier and Fig. 2 is a transverse sectional view. Fig. 3 is a broken view showing more clearly the arrangement of the chambers and the manner of securing the parts together. Figs. 4, 5 and 6 illustrate the elements that form the unit in the structure. Fig. 7 illustrates an adjustable guide or baffle for distributing the air in the chambers of the drier.

1 is a blower for forcing air into the drier 2. The blower 1 may receive air from the atmosphere or it may receive air through the pipe 3 that is connected to some form of heating device where the structure is used as a drier. It of course will be understood that if the grain is to be cooled after a drying process, the pipe 3 will be connected with an air cooling means. To state it generally, the pipe 3 may be connected with any source of air or gaseous supply according to the treatment that the material passing through the structure 2 is to be subjected to.

The blower 1 is connected to the drier 2 by means of a hood 4 which covers one end of the drier and so as to distribute the air over the end and direct it into the ends of chambers formed in the drier.

The chambers of the drier are formed by a plurality of inverted Y-shape sheet metal members 5 having rounded corners 6 and 7 and also rounded or turned back edges 8 and 9 along the flaring sides thereof. The sheet metal walls are made substantially the same length as the drier and are placed in columns side by side and at heights so that the members will be located intermediate the height of the members in adjoining columns. The flaring sides of the sheet metal members in each column are connected together by rhomboidal sheet metal spacing blocks 10 located at the end edges of the inverted Y-shaped sheet metal members 5. The ends 11 and 12 of the rhomboidal space blocks fit the ends of the flaring portions of each consecutive sheet member 5 in each of the columns, while one of the edges 13 fit the parallel side portions 14 on the inverted Y-shaped sheet metal member 5. The corners 15 of the rhomboidal spacing blocks 10 are rounded and the rhomboidal spacing blocks are located so that the rounded corners are placed within the drier.

The sheet metal members 5 are also spaced by the rectangular spacing or end-closing blocks 16 that are placed within one end of each sheet metal member 5 and so as to extend downward from between the flaring portions 17 of the sheet metal member 5. At each end of the drier and in each column, the ends that are thus closed by the spacing blocks 16 alternate so that at the air entering end of the drier, the air will enter each alternate chamber formed by the Y-shape sheet metal members 5 and find an exit through the Y-shaped members that open at the other end of the drier. As shown in Fig. 3 the spacing blocks and the sheet metal chamber forming members in each column are located so as to form the openings 18 at the air entering end of the drier and the openings 19 at the air delivering end of the drier, the opposite ends of the chambers formed by the inverted Y-shaped members being closed by the blocks 16.

The inverted Y-shaped members being formed of one piece and inclosing or forming the air inlet and outlet chambers will prevent leakage from one chamber to the other. The air then can pass from one to the other only by passing around the edges of the flaring portions and through the grain.

The columns formed by the inverted Y-shaped metal members 5 and the spacing blocks 13 and 16 are connected together by the U-shaped sheet metal members or channels 20 having rounded corners. The columns taken with the channels 20 form a complete section of the drier and they are united together by nuts and bolts that extend through openings 21 formed in the ends of the sheet metal members 5 and in the sides of the spacing blocks 10 and 16 and in the sides of the channels 20. The adjoining sections are also connected in the same way. The spacing blocks 16 are also provided with rounded corners 22 so that when the channels 20 and the spacing blocks 13 and 16 are assembled with their edges turned outward, smooth and rounded surfaces are presented to the grain located within the drier. Moreover, the bolts and nuts being located on the outside of the drier, no sharp edges or corner are presented to the grain which would otherwise bruise and injure the hull, shell or surface of the grain. This eliminates the production of chaff while the grain is passing through the drier and moreover prevents cracking and bruising of the grain.

If any of the inverted Y-shaped members 5 become worn or injured or if any of the parts such as the spacing blocks or the chambers become injured, any one or more of the parts may be readily removed without disassembling any of the other parts. All that is necessary is to remove the bolts that pass through the parts and withdraw the parts. The Y-members 5 may be readily drawn out over the spacing members 16 and from between the spacing members 10.

The grain may be directed into a hopper 23 on the top of the drier. A suitable shutter 24 may be provided for regulating the flow of the grain. If the grain is to be cooled after the drying operation, it may be immediately directed into a cooler having a structure like the drier 2, except that cool air may be directed into the cooler. I have shown the drier located above the cooler 25 and connected therewith by a hopper 26. A shutter 27 may also be located intermediate the drier 2 and the cooler 25 if desired.

The grain entering the top of the drier 2 passes down through the spaces formed between the inverted Y-shaped members 5. The Y-shaped members of adjoining columns being located at intermediate heights, the flaring portions 17 and the sides of the sheet metal members 5 of one column will be staggered in their relation with the flaring portions 17 of the sheet metal members 5 of the adjoining columns. The grain will enter the chambers 28 and be directed back and forth as it passes down through the chambers 28. The moving, crowding grain will fill up the space of the chamber 28 so as to move against substantially the whole length and width of the side portions 14 and 17, except for a small narrow margin on the upper edge of the side portion 14. While the grain is thus passing through the chambers 28, it is subjected to cross-air currents that enter through the openings 18. The air will enter through the open ends of the chambers formed by the sheet metal member 5 on the air entering end of the drier and pass downward beneath the turned edges 8 and 9 of the flaring portions of the sides of the sheet metal members 5 and into the chambers 28 through which the grain is passing. The air will thoroughly mix with the rolling, turning and falling grain and pass out through chambers formed by sheet metal members 5 that have ends that open at the air delivery end of the drier. From any one of the chambers formed by the sheet metal members 5, the air may pass down to the chamber below, or it may rise to the chamber above or it may cut across the chambers 28 and pass out through the nearest chambers having ends opening in the air delivery ends of the drier. Likewise the air that enters into the air receiving chambers of the adjoining column may pass upward or downward and enter the outlet chambers above or below and cut across the chambers 28 to the outlet chambers and pass out through the openings in the air delivery end of the drier.

The grain descending through the chambers 28 will thus be subjected to the cross currents of the heated air as the grain passes back and forth across the chambers 28 and through the drier while the hot air is passing across and through the chambers 28 and through the chambers formed by the sheet metal members 5. By the time the grain reaches the lower end of the columns it is thoroughly dried and may then find its exit through the bottom of the drier as through the hopper 26.

Inasmuch as the grain in its movement crowds back and forth along the columns and reaches to near the top of the sheet metal portions 5, it comes in contact with a large heated surface, namely, substantially the total area of the side portions 14 and 17 of the sheet metal members 5. This heats the grain and eliminates its moisture which is carried off by the air passing through the falling grain.

In order that the air from the blower may be distributed throughout the width of the chamber 28, an adjustable means is provided for baffling the air. Without the baffling means, the major portion of the air entering the drier would cut diagonally across and pass beneath the center or the last third of the flaring portions 17 of the sheet metal members 5 instead of distributing itself evenly throughout the chambers 28. Therefore the grain that passes through the chambers 28 near the air entering end of the drier would not be dried as thoroughly as the grain that passes through the drier near the air delivering end. In the chambers formed by the sheet metal members 5 which have ends that open at the air entering end of the drier are placed adjustable baffle strips. One of the sets of baffle strips is shown in Figs. 1 and 7. The baffles are mounted on a pair of strips 30 and 31 that are hinged together by the pintle 32. The baffles 33 and 34 may be hinged to the strips 30 and 31. The baffles 33 and 34 are preferably curved and when the set is placed in one of the air receiving chambers, the lower ends of the baffles 33 and 34 are preferably located at points that are one-third and two-thirds of the distance of the length of the sheet metal member 5 that is of the width of the drier. The upper ends of the baffles 33 and 34 are secured in position by threaded rods 35 and 36 which are secured to the strips 31 and 30. Adjustments of the entire length of the baffles 33 and 34 are secured by the nuts 37 located on opposite sides of the baffles and which are threaded onto the rods 35 and 36. Preferably the upper ends of the baffles 33 are located at points equal to one-third and two-thirds of the height of the air receiving chambers of the drier so as to cause one-third of the air entering each air receiving chamber to be distributed over one-third of the width of the chamber 28 through which the grain passes. The air entering the air receiving chamber will strike the baffles and some of it will recurve backward. This is particularly of value to cause the air to dry the grain that passes through the chambers near the air receiving end of the drier.

The strips 30 and 31 with their baffles are hinged together by means of the pintle 32 so that they may be readily inserted in the air receiving chambers of the drier notwithstanding the proximity of the end wall of the hood 4. The ends 38 of the sets of baffles may be bolted by bolts that pass through the tops of the sheet metal members 5 that form the air delivery chamber and the upper ends of the spacing blocks 16 which are located in the air receiving end of the drier. The baffle sets will be maintained in their upright position by the edges of the baffle strips 33 and 34 substantially fitting the inner surfaces of the portions 14 of the side walls of the sheet metal members 5.

Inasmuch as the small units form the columns and the columns form the drier, the drier may be readily altered in its size by the addition or removal of the units to change the height of the drier and the addition or removal of columns to change the width of the drier. This may be done to make the drier either smaller or larger.

I claim:

1. In a grain treating means, a plurality of edge fitting members forming a unit, a plurality of units forming air inlet and air outlet chambers, a plurality of columns connecting with the air inlet and outlet chambers and forming grain receiving chambers.

2. In a grain treating means, a plurality of inverted Y-shaped sheet metal parts, spacing blocks and inclosing blocks located at the ends of the sheet metal members forming units, the units arranged in columns and forming air receiving and air delivering chambers, spacing members intermediate the columns and forming grain passage-ways.

3. In a grain treating means, a plurality of inverted Y-shaped sheet metal members arranged in vertical series, rhomboidal spacing blocks fitting the sides of the inverted Y-members, closing blocks located between the rhomboidal members and in the opposite ends of the succeeding inverted Y-members and so as to form air receiving and air delivery chambers of each alternate inverted Y-member, means for directing grain beside the series of inverted Y-members.

4. In a grain treating means, a plurality of air receiving chambers and air delivering chambers arranged in columns, means for directing grain between the columns, adjustable baffle plates located in the air receiving chambers.

5. In a grain treating means, a plurality of air receiving chambers and air delivering chambers arranged in columns, means for directing grain between the columns, a pair of adjustable baffle plates located in the air receiving chambers and at heights about equal to one-third and two-thirds of the height of the air receiving chambers.

6. In a grain treating means, a plurality of air receiving chambers and air delivering chambers arranged in columns, means for directing grain between the columns, a pair of adjustable baffle plates located in the air receiving chambers and at heights about equal to one-third and two-thirds of the height of the air receiving chambers, the lower ends of the baffle plates being located at about one-third and two-thirds the length of the air receiving chamber from the air inlets of the chambers.

7. In a grain treating means, a plurality of removable grain baffling members arranged columnmetrically, a plurality of removable spacing blocks fitting the ends of the baffle members and having removable securing means located at the outer edges of the blocks and baffle members.

8. In a grain treating means, a plurality of inverted Y-shaped members forming air distributing and air delivering chambers arranged in columns, rhomboidal sheet metal blocks fitting the ends of the inverted Y-members, removable connecting means located at the outer edges of the inverted Y-members and the blocks.

9. In a grain treating means, a plurality of inverted Y-shaped members forming air distributing and air delivering chambers arranged in columns, rhomboidal sheet metal blocks fitting the ends of the inverted Y-members, removable connecting means located at the outer edges of the inverted Y-members and the blocks, and channel members located between the ends of the columns and connected to the columns by removable securing means passing through the edges of the channels and the spacing blocks.

10. In a grain treating means, a plurality of sheet metal members, each forming the walls of air inlet and air delivery chambers having openings on the lower side thereof and spacing blocks fitting the edges of the sheet metal members.

In testimony whereof, I have hereunto signed my name to this specification.

WILLIAM J. SEDELBAUER.

Copies of this patent may be obtained for five cents each, by addressing the "Commissioner of Patents. Washington, D. C."